United States Patent [19]

Froewis et al.

[11] Patent Number: 5,054,983
[45] Date of Patent: Oct. 8, 1991

[54] ATTACHMENT MEMBER WITH A COLLAPSIBLE SECTION FOR SECURING INSULATION PANELS

[75] Inventors: Markus Froewis, Frastanz; Josef Schmidle, Göfis, both of Austria

[73] Assignee: Hilti Aktiengesellschaft

[21] Appl. No.: 587,224

[22] Filed: Sep. 24, 1990

[30] Foreign Application Priority Data

Sep. 23, 1989 [DE] Fed. Rep. of Germany ....... 3931833

[51] Int. Cl.[5] .......................... F16B 15/02; F16B 43/00
[52] U.S. Cl. .................................. 411/480; 411/531; 411/544; 52/410
[58] Field of Search ............... 411/441, 480, 531, 544, 411/546, 542, 923; 52/410, 512, 701, 704, 707, 711

[56] References Cited

U.S. PATENT DOCUMENTS

| | | | |
|---|---|---|---|
| 4,380,413 | 4/1983 | Dewey | 411/531 |
| 4,545,270 | 10/1985 | Dewey | 411/544 |
| 4,757,661 | 7/1988 | Hasan | 52/410 |
| 4,915,561 | 4/1990 | Buhri et al. | 411/441 |

Primary Examiner—Neill R. Wilson
Attorney, Agent, or Firm—Toren, McGeady & Associates

[57] ABSTRACT

A member (1) for securing insulation panels (7) to a structural component (8) is formed of an annular head (2) and an axially extending hollow shaft (3) extending from the head. The hollow shaft (3) is arranged to receive a nail (9) for fixing the member to the structural component (8). An axially extending section (4) is positioned within the hollow shaft (3) and has an abutment (5) at its end closer to the head (2). When the nail (9) is driven into the structural component (8) its head (2) contacts the abutment (5) and at least an axially extending part (4) of the section is collapsible to compensate for excess driving energy supplied to the nail whereby it is inserted for variable depths into the structural component (8). The collapsible part (4) of the section prevents compressive forces from exercising any damaging effect on the insulation panels (7).

3 Claims, 2 Drawing Sheets

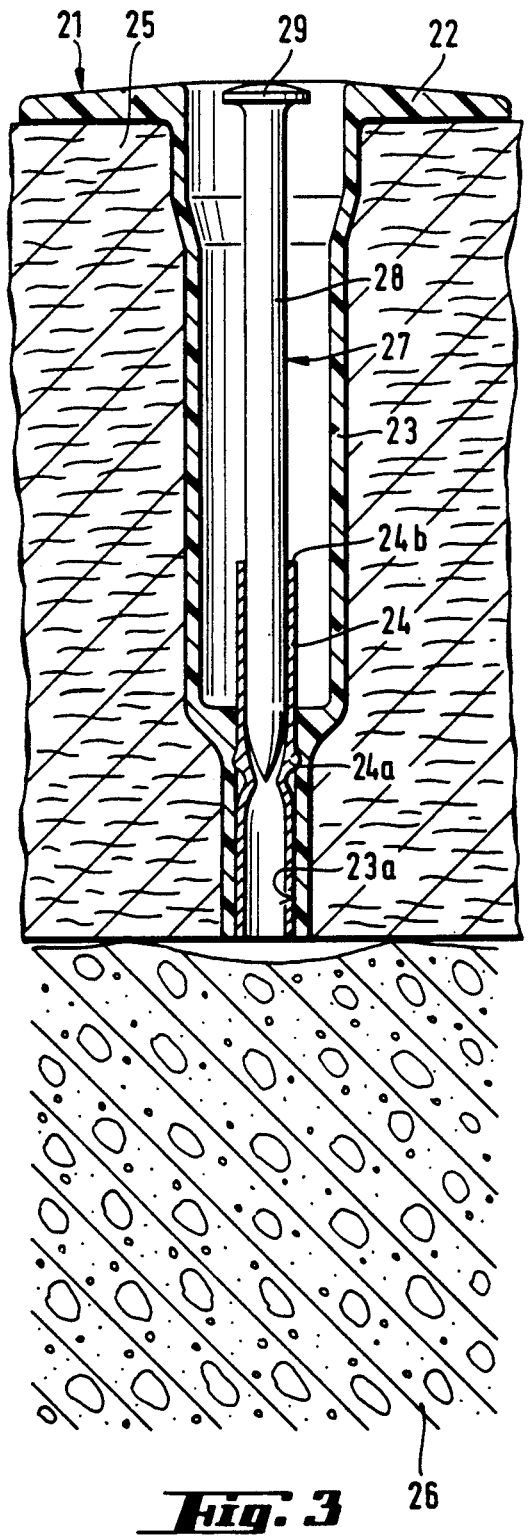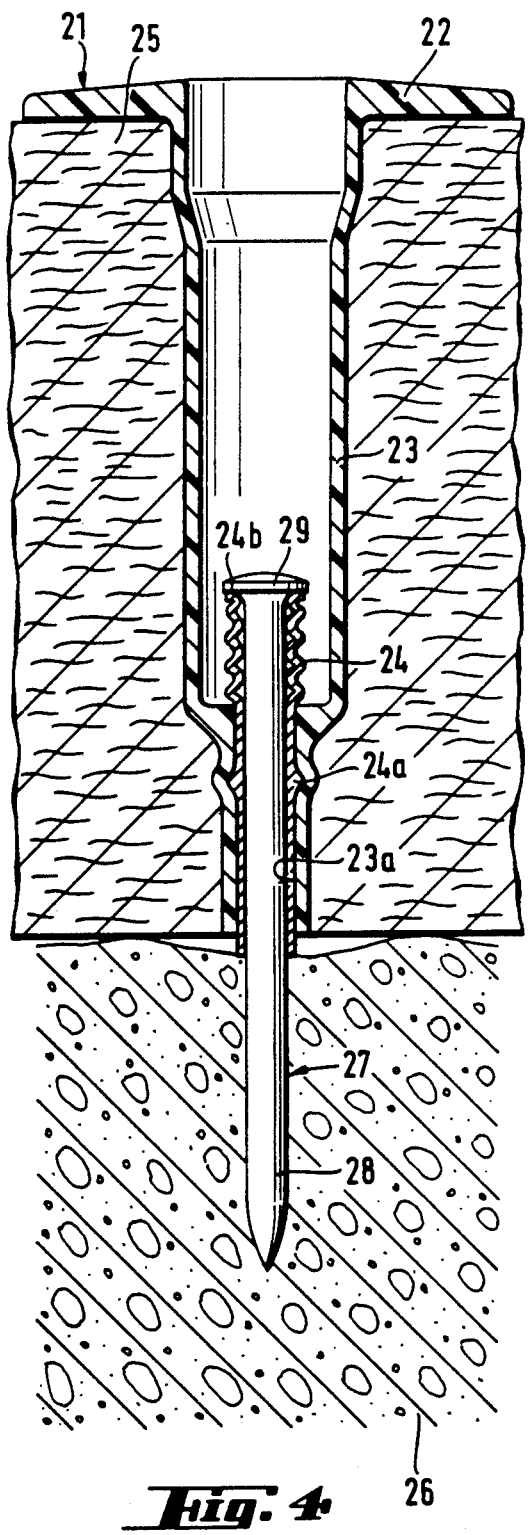

ATTACHMENT MEMBER WITH A COLLAPSIBLE SECTION FOR SECURING INSULATION PANELS

BACKGROUND OF THE INVENTION

The present invention is directed to a member for securing insulation panels to structural components. The element has a large area head with a hollow shaft extending axially from the head. The hollow shaft has a collapsible section which forms an abutment for a nail to be driven through the hollow shaft into the structural component.

A basically mushroom shaped attachment member is disclosed in EP-A-0 187 168 for securing insulation plates formed mainly of material of low compression strength to structural components. The attachment member is fixed to the structural component by a nail. The driving resistance of the nail can vary because of non-uniform strength of the structural component formed, for instance, of concrete, whereby the nail may be driven in for different depths, if the nails are driven by an explosive powder charge operated driving tool affording a predetermined amount of energy. To avoid that the different depths of penetration of the nail would cause destruction of the hollow shaft, one wall section is designed as a collapsible region. Based on the depth of the penetration of the nail, the collapsible region is deformed to a lesser or greater degree if there is excess energy, so that the overall length of the member is shortened. Accordingly, the head of the attachment member penetrates to some extent into the insulation panel, and damage to the insulation panel on its outer surface can occur in the region of the attachment member. Further, the movement of the head for different depths into the insulation panel results in an uneven outer surface of the panel which affords an unpleasant appearance.

SUMMARY OF THE INVENTION

Therefore, it is the primary object of the present invention to provide a member for securing insulation panels to structural components or parts whereby the head of the member is maintained at the surface of the panel though the nail securing the panel to the structural component may have a variable depth of penetration.

In accordance with the present invention, a collapsible region is provided between an abutment and the hollow shaft part of the member.

A nail, such as driven by an explosive powder charge operated setting tool, runs up against the abutment and any excess energy is absorbed by a reduction in the length of a collapsible region within the hollow shaft, while the nail remains in contact with the abutment which forms one end of the collapsible region. While the axial length of the collapsible region is reduced, the position of the head of the securing member relative to the structural component does not change, so that independently of the depth of penetration of the nail, the head of the member does not become recessed into surface of the insulation panel.

The collapsible section can be formed as a separate upsettable or collapsible part positioned within the hollow shaft. The collapsible section can be located in a part of the hollow shaft inwardly of the head of the securing member. As a result, short nails can be used, since in the inserted condition, the nails must project only beyond the structural component along a partial section of the axial length of the hollow shaft.

Preferably, the collapsible section is constructed as a sleeve, to assure a uniform distribution of the forces introduced by the nail through the abutment. As a result, a defined continuous deformation of the collapsible section is achieved.

Where the collapsible region is in the form of an independent sleeve, the exposed length of the sleeve correspond to 2 to 5 times the diameter of the bore and the wall thickness corresponds to 0.2 to 0.5 times the bore diameter of the hollow shaft.

In one preferred arrangement, the collapsible section is formed integrally with the hollow shaft as a single unit affording advantages in fabrication, particularly when the securing member is fabricated by injection molding from plastics material.

In another embodiment of the invention, the collapsible section is provided as an isolated sleeve secured in the hollow shaft, such as by an interference fit. While steel is suitable as a material for the collapsible sleeve and permits a thin wall thickness, the remainder of the securing member can be formed of plastics material. This embodiment is especially suited for application where there may be a cavity between the adjacent surfaces of the insulation panels and the structural components.

The end of the collapsible section sleeve directed away from the abutment is advantageously aligned with the end of the hollow shaft facing away from the head, whereby the sleeve must be displaced toward the structural component only by the amount of the gap formed by the cavity between the adjacent surfaces.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 3 is an axially extending sectional view of a member with a nail inserted into the member and before the nail is driven into the component; and FIG. 4 is a view similar to FIG. 3, but with the nail driven with excess driving energy into the structural component.

DETAILED DESCRIPTION OF THE INVENTION

Figure 1:
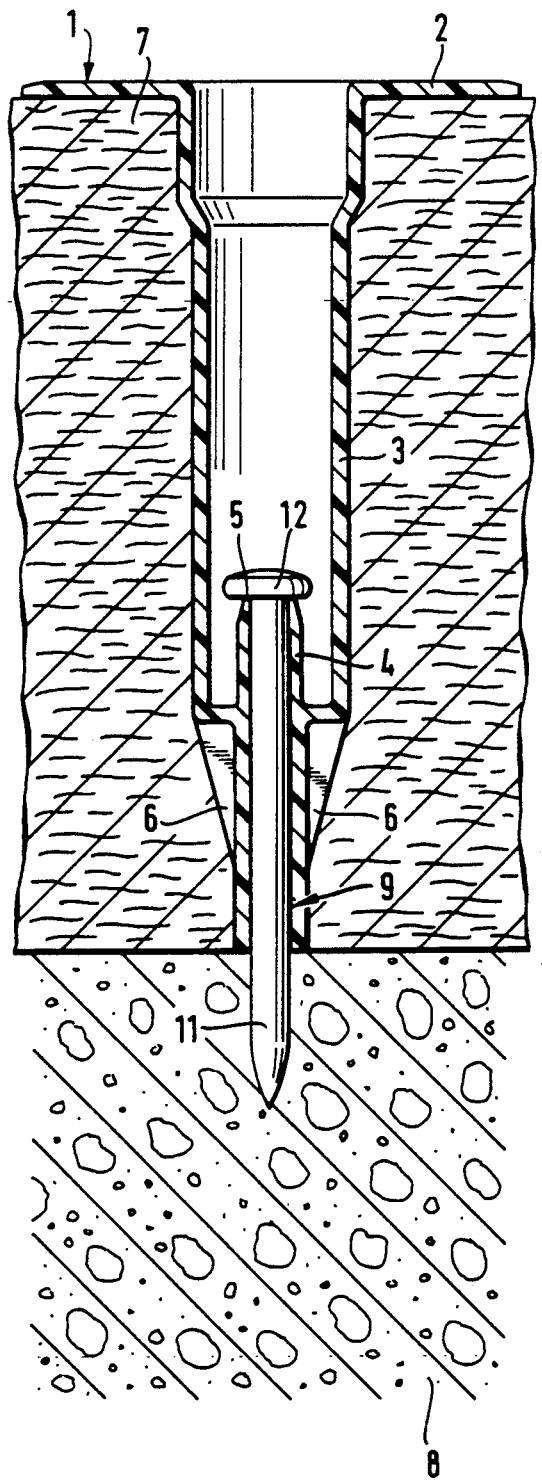
FIG. 1 is an axially extending sectional view of a member securing an insulation panel to a structural component.
Figure 2:
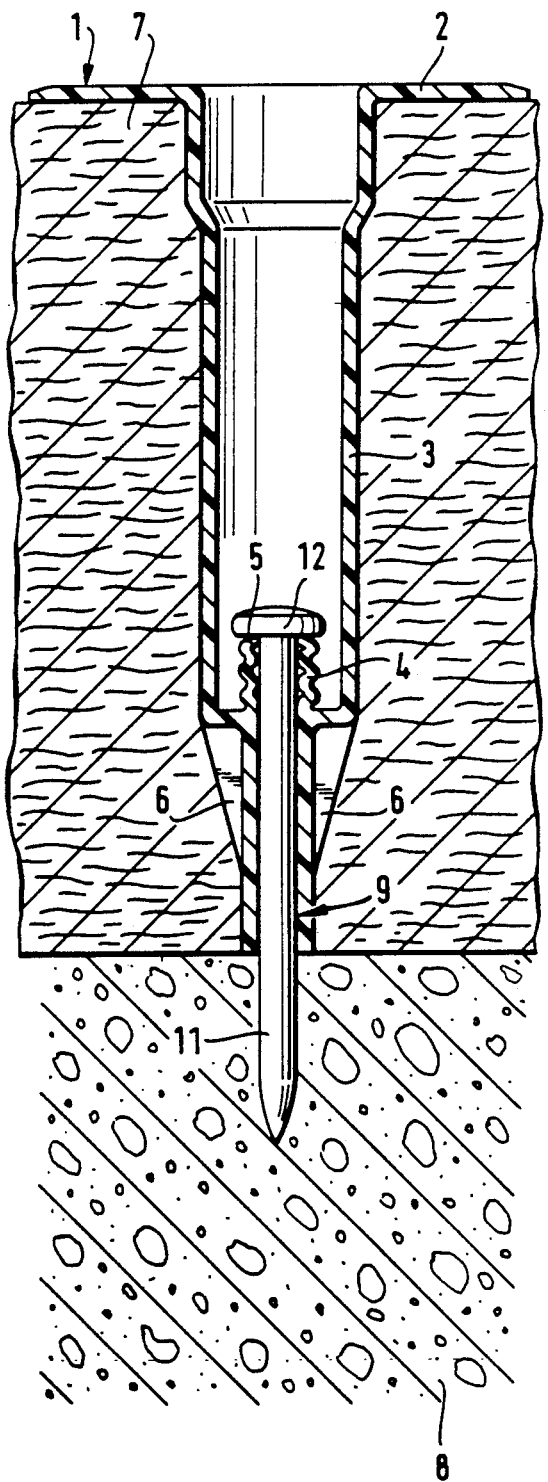
FIG. 2 is a view similar to FIG. 1 with the nail driven to a greater depth into the structural component as compared to FIG. 1 due to excess driving energy.

In FIGS. 1 and 2 a member 1 is illustrated having a large area annular head 2 with an axially extending hollow shaft 3 aligned with and extending from an opening in the head. An axially upsettable or collapsible sleeve 4 is located within the hollow shaft 3 and the free end of the sleeve 4 serves as an abutment 5. The opposite end of the sleeve 4 from the abutment 5 is formed monolithically with the hollow shank 3 and is axially supported by such interconnection. From the location of the connection of the sleeve 4 to the hollow shaft 3 to the end of the shaft 3 spaced from the head 2, the shaft 3 is stepped radially inwardly and has tapering longitudinal ribs 6 for increasing the bending stiffness of the shaft 3. The ribs 6 taper inwardly from the radially outer surface of the hollow shaft 3 at the location of the inward step and extend for approximately half of the distance from the inward step to the opposite end of the shaft 3 from the head 2.

Member 1 secures an insulation panel or plate 7 to a structural component or part 8. In the securement procedure, initially the hollow shaft 3 of the member 1 is pushed through the insulation panel 7 which has been predrilled for this purpose. The head 2 rests against the outer surface of the insulation panel 7, while the free end of the hollow shaft 3, that is, the opposite end from the head 2, abuts against the surface of the structural component 8. A nail 9 with a shaft 11 is driven through the hollow shaft 3 into the structural component 8 preferably by an explosive powder charge operated driving tool. With correct metering of the driving energy, the nail head 12 contacts the abutment 5 at the end of the driving step and the member 1 and the insulation panel 7 are secured to the structural component 8.

In the condition of the member 1 as shown in FIG. 2, the step of driving the nail 9 has been executed with excess driving energy as a result of the structural component 8 having a lower resistance to the driving of the nail 9 due to a lack of homogeneity at the attachment point, which is not the case in the securement operation displayed in FIG. 1. Due to the deeper penetration of the nail shank 11 into the structural component 8, the sleeve 4 is collapsed in a bellows-like manner as its absorbs the excess energy. The nail head 12 remains in contact with the abutment 5, however, the head 2 does not become recessed into the surface of the insulation panel 7.

In FIGS. 3 and 4 a similar member 21 is illustrated made up of an annular head 22 with an axially extending hollow shaft 23 projecting from the head 22 and being aligned with its opening. The lower end of the member 21, as viewed in FIGS. 3 and 4, has an inwardly stepped arrangement. A collapsible sleeve 24 is located within the hollow shaft 23 with a portion of the sleeve 24 projecting from the stepped part of the hollow shaft 23 toward the head 22. Preferably, the sleeve 24 is formed of steel. Sleeve 24 is displaceably retained by a snug fit in the central bore 23a of the end section of the hollow shaft 23 extending downwardly from the inwardly stepped part of the shaft 23. In the region of the sleeve 24 extending into the central bore 23a of the hollow shaft 23, a circumferential bead 24a is located and is radially supported in the sleeve 4 central bore. The end of the sleeve 24 closer to the head 22 forms an abutment 24b. Member 21 is used for securing an insulation panel 25 to the surface of a structural component 26 and is fixed to the component by a nail 27. In affixing the insulation panel 25 to the structural component 26, initially the hollow shaft 23 of the member 21 is pushed through the insulation panel 25 possibly through a predrilled hole, until the head 22 comes into contact with the outer surface of the insulation panel 25. Before the securement procedure the free end of the hollow shaft 23 and the corresponding end of the sleeve 24 held within the hollow shaft 23 are located at the surface of the insulation panel 25 adjacent to the surface of the structural component 26 (FIG. 3).

As can be noted in FIG. 3, the surface of the insulation panel 25 is not in contact with the surface of the structural component 26 in the region of the hollow shaft 23 due to the uneven surface of the component 26, thus a so-called cavity or recessed contact is present and can be bridged by the end of the sleeve 24. At the commencement of the driving of the nail 27, the nail carries the sleeve 24 with it in the driving direction until it contacts the surface of the structural component 26 overcoming the clamping force between the sleeve 24 and the hollow shaft 23. Next, the nail 27 is displaced relative to the sleeve 24 so that it can penetrate into the structural component 26. Accordingly, the sleeve 24 is widened or expanded by the shank 28 of the nail 27 in the region of the bead 24a, and the bead is pressed radially outwardly into the wall of the hollow shaft 23 in a positively locked manner as shown in FIG. 4. Accordingly, sleeve 24 is reliably fixed in the axial direction within the hollow shaft 23. Toward the end of the driving step, the nail head 29 runs up against the abutment 24b. If excess energy is present, the part of the sleeve 24 projecting upwardly from the inwardly stepped part of the hollow shaft 23 collapses axially as displayed in FIG. 4. The collapse of the sleeve 24 results in an increase in the diameter of the sleeve 24 projecting upwardly from the inwardly stepped part of the hollow shaft 23 and provides an axial support for the hollow shaft 23.

While specific embodiments of the invention have been shown and described in detail to illustrate the application of the inventive principles, it will be understood that the invention may be embodied otherwise without departing from such principles.

We claim:

1. A member for securing insulation panels (7, 25) to a structural component (8,26) comprising a large area annular head having an opening therethrough, a hollow shaft of smaller transverse area than said head secured to and extending axially from said head in alignment with the opening therein, an axially extending section positioned within said hollow shaft and having a first end closer to said head and a second end more remote from said head, said first end forming an abutment, said hollow shaft arranged to receive a nail and said abutment arranged to form a stop for the nail, at least an axially extending part of said section being collapsible between said abutment and the second end of said section, said axially extending part is spaced inwardly from said hollow shaft, said axially extending part is formed as a sleeve.

2. A member, as set forth in claim 1, wherein the second end of said sleeve is flush with a second end of said hollow shaft at the opposite end thereof from said head.

3. A member, as set forth in claim 2, wherein said sleeve is formed of steel and has a circumferential bead therein arranged to be pressed radially outwardly when the nail is driven through said hollow shaft for interlocking said sleeve and said hollow shaft.

* * * * *

UNITED STATES PATENT AND TRADEMARK OFFICE
CERTIFICATE OF CORRECTION

PATENT NO. : 5,054,983

DATED : October 8, 1991

INVENTOR(S) : Markus Froewis et al

It is certified that error appears in the above-identified patent and that said Letters Patent is hereby corrected as shown below:

On the title page, item [73] Assignee: should read as follows:

--[73] Assignee: Hilti Aktiengesellschaft,
Fürstentum Liechtenstein --.

Signed and Sealed this

Thirteenth Day of April, 1993

Attest:

STEPHEN G. KUNIN

*Attesting Officer*     *Acting Commissioner of Patents and Trademarks*